(No Model.)
T. W. BOYLE.
COTTON AND CORN SCRAPER AND CULTIVATOR.
No. 344,716. Patented June 29, 1886.
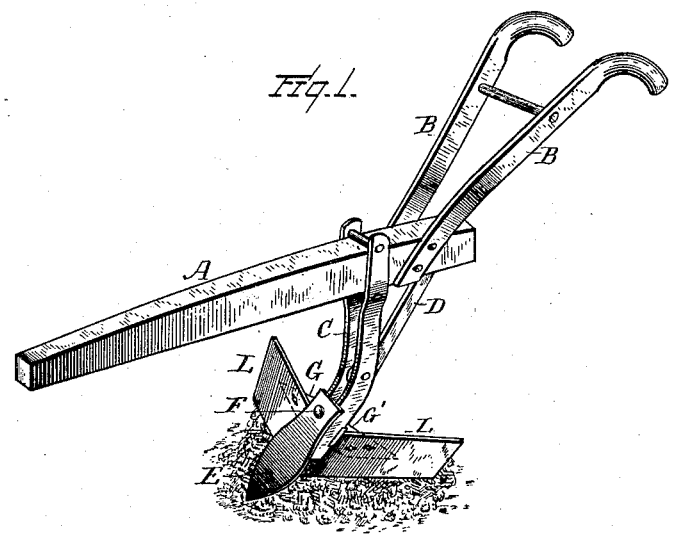
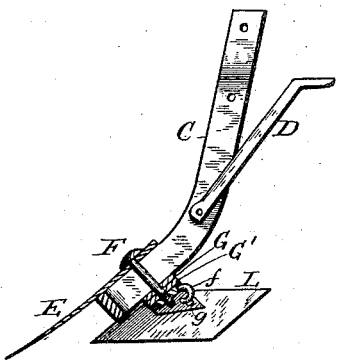
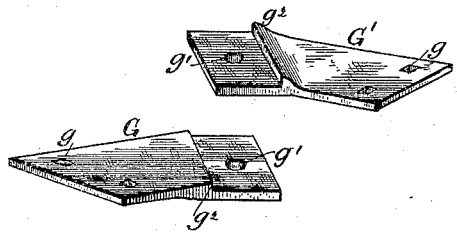
Witnesses:
O. C. Hurdeman
W. B. Masson
Inventor:
Thaddeus W. Boyle
by E. E. Masson
atty

UNITED STATES PATENT OFFICE.

THADDEUS W. BOYLE, OF AUGUSTA, GEORGIA.

COTTON AND CORN SCRAPER AND CULTIVATOR.

SPECIFICATION forming part of Letters Patent No. 344,716, dated June 29, 1886.

Application filed April 26, 1886. Serial No. 200,156. (No model.)

*To all whom it may concern:*

Be it known that I, THADDEUS W. BOYLE, a citizen of the United States, residing at Augusta, in the county of Richmond, State of Georgia, have invented certain new and useful Improvements in Cotton and Corn Scrapers and Cultivators, of which the following is a specification, reference being had therein to the accompanying drawings.

My invention relates to an improvement in scrapers and cultivators which are used especially for the cultivation of cotton; and it consists in making the head that supports the scraping-wings in two separable parts, either one of which can be used independently of the other, the object of which is to permit the cultivator-point to stir the ground close to the roots of the growing plants without danger of injuring the portion thereof projecting above the ground. I accomplish this by the construction illustrated in the accompanying drawings, in which—

Figure 1 is a perspective view of a cotton-scraper constructed in accordance with my invention. Fig. 2 is a longitudinal vertical section of the same removed from the beam. Fig. 3 represents, on an enlarged scale, the two parts forming the wing-carrying head.

In said drawings, A represents an ordinary plow-beam, provided with handles B and a standard, C, constructed preferably of a single bar of wrought-iron bent in the middle of its length, and having its ends secured to the beam. The standard is braced to the beam by a bar, D, having its lower end secured to the standard and its upper end to the under side of the beam. To the front of the standard is secured an ordinary "bull-tongue" or "scooter" cultivator-point, E, by means of the bolt F.

Secured to the rear of the standard C by the same bolt is a head formed of two halves, G and G', of cast or of wrought metal, having their outer ends cut diagonally, and provided with perforations $g$, to receive small bolts to secure thereto the wings or blades L, having their upper and lower edges straight and parallel and the ends cut off diagonally. Their lower edge is sufficiently sharp to cut any grass and weeds which may be growing between the rows of plants.

The advantages obtained by making the wing-supporting head in two halves in place of in one piece, as heretofore, are that it permits either half and wing to be used singly in "barring off" or cultivating close to the roots of cotton and corn.

To prevent either the half-head G or G' from turning upon the bolt F when only one of these halves is used at a time, each one is provided with a shoulder, $g^2$, to abut against the side of the standard, and centrally between this shoulder and the inner end of the head is a perforation, $g'$, to receive the bolt F, and a nut, $f$, upon the end of said bolt will secure either one of the halves G or G', or both of them together, against the rear of the standard.

Having now fully described my invention, I claim—

A cotton-scraper consisting of a plow beam and handles, a standard, a cultivator-point in front of said standard, a head formed of two parts, G G', separately and collectively attachable to the rear of said standard, a bolt passing through the cultivator-point and through these parts of the head, and blades secured to the two parts of the head, substantially as and for the purpose described, whereby one or both supports for the wings or blades may be removed.

In testimony whereof I affix my signature in presence of two witnesses.

THADDEUS W. BOYLE.

Witnesses:
B. H. WEISIGER,
R. L. WASHINGTON.